US010293555B2

(12) United States Patent
Kojima et al.

(10) Patent No.: US 10,293,555 B2
(45) Date of Patent: May 21, 2019

(54) LIQUID MATERIAL FOR FORMING THREE-DIMENSIONAL OBJECT AND MATERIAL SET FOR FORMING THREE-DIMENSIONAL OBJECT, AND THREE-DIMENSIONAL OBJECT PRODUCING METHOD

(71) Applicants: Mariko Kojima, Tokyo (JP); Yoshihiro Norikane, Kanagawa (JP); Keiko Osaka, Kanagawa (JP); Hiroshi Iwata, Kanagawa (JP); Mitsuru Naruse, Shizuoka (JP); Nozomu Tamoto, Shizuoka (JP)

(72) Inventors: Mariko Kojima, Tokyo (JP); Yoshihiro Norikane, Kanagawa (JP); Keiko Osaka, Kanagawa (JP); Hiroshi Iwata, Kanagawa (JP); Mitsuru Naruse, Shizuoka (JP); Nozomu Tamoto, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 534 days.

(21) Appl. No.: 14/938,257

(22) Filed: Nov. 11, 2015

(65) Prior Publication Data

US 2016/0160021 A1 Jun. 9, 2016

(30) Foreign Application Priority Data

Dec. 4, 2014 (JP) ................................ 2014-245719

(51) Int. Cl.
*C09D 129/04* (2006.01)
*B29C 67/00* (2017.01)
(Continued)

(52) U.S. Cl.
CPC .......... *B29C 67/0081* (2013.01); *B22F 3/008* (2013.01); *B29C 64/165* (2017.08);
(Continued)

(58) Field of Classification Search
CPC combination set(s) only.
See application file for complete search history.

(56) References Cited

U.S. PATENT DOCUMENTS

| | | | | |
|---|---|---|---|---|
| 7,049,363 B2 | 5/2006 | Shen | | |
| 2005/0070671 A1* | 3/2005 | Torii | ...................... | A61L 15/60<br>525/329.7 |

(Continued)

FOREIGN PATENT DOCUMENTS

| | | |
|---|---|---|
| JP | 2000-328106 | 11/2000 |
| JP | 2003-048253 | 2/2003 |

(Continued)

OTHER PUBLICATIONS

U.S. Appl. No. 14/816,370, filed Aug. 3, 2015.
Japanese Office Action dated Oct. 9, 2018 in Patent Application No. 2014-245719.

*Primary Examiner* — Mark S Kaucher
(74) *Attorney, Agent, or Firm* — Oblon, McClelland, Maier & Neustadt, L.L.P.

(57) ABSTRACT

Provided is a liquid material for forming a three-dimensional object. The liquid material is adapted to harden a powder material for forming a three-dimensional object containing an organic material. The liquid material contains a solvent and a cross-linking agent. A dynamic contact angle of the liquid material over a film made of the organic material is from 20° to 80°.

15 Claims, 2 Drawing Sheets

(51) Int. Cl.

| | |
|---|---|
| ***B33Y 10/00*** | (2015.01) |
| ***B22F 3/00*** | (2006.01) |
| ***B29C 64/165*** | (2017.01) |
| *B33Y 30/00* | (2015.01) |
| *B33Y 70/00* | (2015.01) |
| *B29K 105/00* | (2006.01) |
| *B29K 29/00* | (2006.01) |
| *B28B 1/00* | (2006.01) |

(52) U.S. Cl.
CPC ............ *B33Y 10/00* (2014.12); *C09D 129/04* (2013.01); *B28B 1/001* (2013.01); *B29K 2029/04* (2013.01); *B29K 2105/251* (2013.01); *B33Y 30/00* (2014.12); *B33Y 70/00* (2014.12)

(56) References Cited

U.S. PATENT DOCUMENTS

| | | | | |
|---|---|---|---|---|
| 2006/0165546 A1 | 7/2006 | Yamada et al. | | |
| 2008/0138515 A1 | 6/2008 | Williams | | |
| 2009/0062176 A1* | 3/2009 | Seidling | C11D 3/3738 510/406 | |

FOREIGN PATENT DOCUMENTS

| | | | |
|---|---|---|---|
| JP | 2004-330743 | | 11/2004 |
| JP | 2005-297325 | | 10/2005 |
| JP | 2006-200030 | | 8/2006 |
| JP | 2010-512255 | | 4/2010 |
| JP | 2011-230421 | * | 11/2011 |
| JP | 2014-46305 | A | 3/2014 |
| WO | WO2015/046629 | A1 | 4/2015 |

* cited by examiner

LIQUID MATERIAL FOR FORMING THREE-DIMENSIONAL OBJECT AND MATERIAL SET FOR FORMING THREE-DIMENSIONAL OBJECT, AND THREE-DIMENSIONAL OBJECT PRODUCING METHOD

BACKGROUND OF THE INVENTION

Field of the Invention

The present invention relates to a liquid material for forming a three-dimensional object and a material set for forming a three-dimensional object, and a three-dimensional object producing method.

Description of the Related Art

In recent years, there have been increasing needs for small-lot production of complicated, fine three-dimensional objects. As the techniques for meeting these needs, a powder sintering method, a powder adhering method, etc. have been proposed (see, e.g., Japanese Patent Application Laid-Open Nos. 2000-328106, 2006-200030, and 2003-48253).

The powder sintering method is a method for forming a powder thin layer, irradiating the thin layer with laser light to form a thin sintered body, and repeating these steps to stack layers of thin sintered bodies over the thin sintered body sequentially to obtain a desired three-dimensional object. The powder adhering method is a method for hardening a powder thin layer with an adhesive material instead of by laser sintering in the powder sintering method, and stacking such hardened powder thin layers to obtain a desired three-dimensional object.

Proposed examples of the powder adhering method include a method for supplying an adhesive material to a powder thin layer by ink-jetting, a method for stacking layers of a powder material, which is a mixture of powder particles and adhesive particles, and delivering a binding agent to the layers to dissolve and solidify the adhesive particles and produce a three-dimensional object (see JP-A No. 2004-330743), and a method for dissolving a powder material containing a base such as glass and ceramic and a hydrophobic resin coating the base with a resin coated with a hydrophobic solvent such as limonene and solidifying the powder material and the resin to produce a three-dimensional object (see JP-A No. 2005-297325).

However, inkjet supplying of the adhesive material may be accompanied by clogging of the nozzles used, limitations in the selection of adhesive materials that can be used, problems of inefficiency due to large costs involved, etc.

Further, the technique described in JP-A No. 2004-330743 has a problem that dissolving of the adhesive particles by delivering the binding material may result in uneven spreading of the dissolved adhesive liquid between the powder particles, thus making it less likely for the three-dimensional object to have a sufficient strength and precision.

The technique described in JP-A No. 2005-297325 has a risk that the limonene having a low volatility tends to remain in the three-dimensional object and reduces the strength of the three-dimensional object. Furthermore, lowly volatile solvents such as toluene are problematic in safety. Moreover, the powder material needs to be coated with the coating resin having a large coating film thickness (i.e., needs to be coated with a large amount of the coating resin) in order for the powder particles to be bound together at only the coating resin. This makes it impossible for the three-dimensional object to have a sufficient precision, or brings about a problem that the density of the base material in the three-dimensional object is low. Particularly, when the final goal of the three-dimensional object produced is a metal sintered body or a ceramic sintered body that needs a post-treatment such as dewaxing of the resin and sintering, the incapability of providing the base material at a sufficiently high density makes problems relating to the strength and precision of the sintered body outstanding.

Further, U.S. Pat. No. 7,049,363 proposes, as materials used in 3D printing, a liquid as a first constituent element and particles of a binder soluble in the liquid as a second constituent element, and discloses that the liquid or the binder contains a polymerization initiator such as a peroxide. However, the polymerization initiator such as the peroxide dissolves under heat or light ambient conditions and becomes deactivated, because of the polymerization initiator's characteristic of spontaneously dissolving under heat or light to produce radicals and initiate a reaction. Hence, there is a problem that a liquid containing such a polymerization initiator has a poor storage stability.

JP-A No. 2011-230421 discloses a layer forming step of forming a layer of a three-dimensional object forming powder containing a water-soluble polymer and a step of jetting a forming liquid containing water as a solvent to the layer formed in the layer forming step from an inkjet head to form a layer including a product produced from dissolution of the three-dimensional object forming powder in the forming liquid. However, the formed layer is poor in strength as a hardened product, because the powder particles in the formed layer are not firmly bound together by means of a cross-linking agent. Furthermore, JP-A No. 2011-230421 discloses use of glycerin, diethylene glycol, and polyethylene glycol as thickening wetting agents. However, these multihydric alcohols do not easily vaporize, but remain after the three-dimensional object production and reduce the strength of the hardened product.

SUMMARY OF THE INVENTION

An object of the present invention is to provide a liquid material for forming a three-dimensional object, used for producing a three-dimensional object having a complicated, highly-strong stereoscopic (three-dimensional (3D)) shape and a dense sintered body including few voids.

A liquid material for forming a three-dimensional object of the present invention as a solution to the problems described above is a liquid material adapted to harden a powder material for forming a three-dimensional object containing an organic material, and contains a solvent and a cross-linking agent. A dynamic contact angle of the liquid material over a film made of the organic material is from 20° to 80°.

According to the present invention, it is possible to provide a liquid material for forming a three-dimensional object, used for producing a three-dimensional object having a complicated, highly-strong stereoscopic (three-dimensional (3D)) shape and a dense sintered body including few voids.

Figure 1:
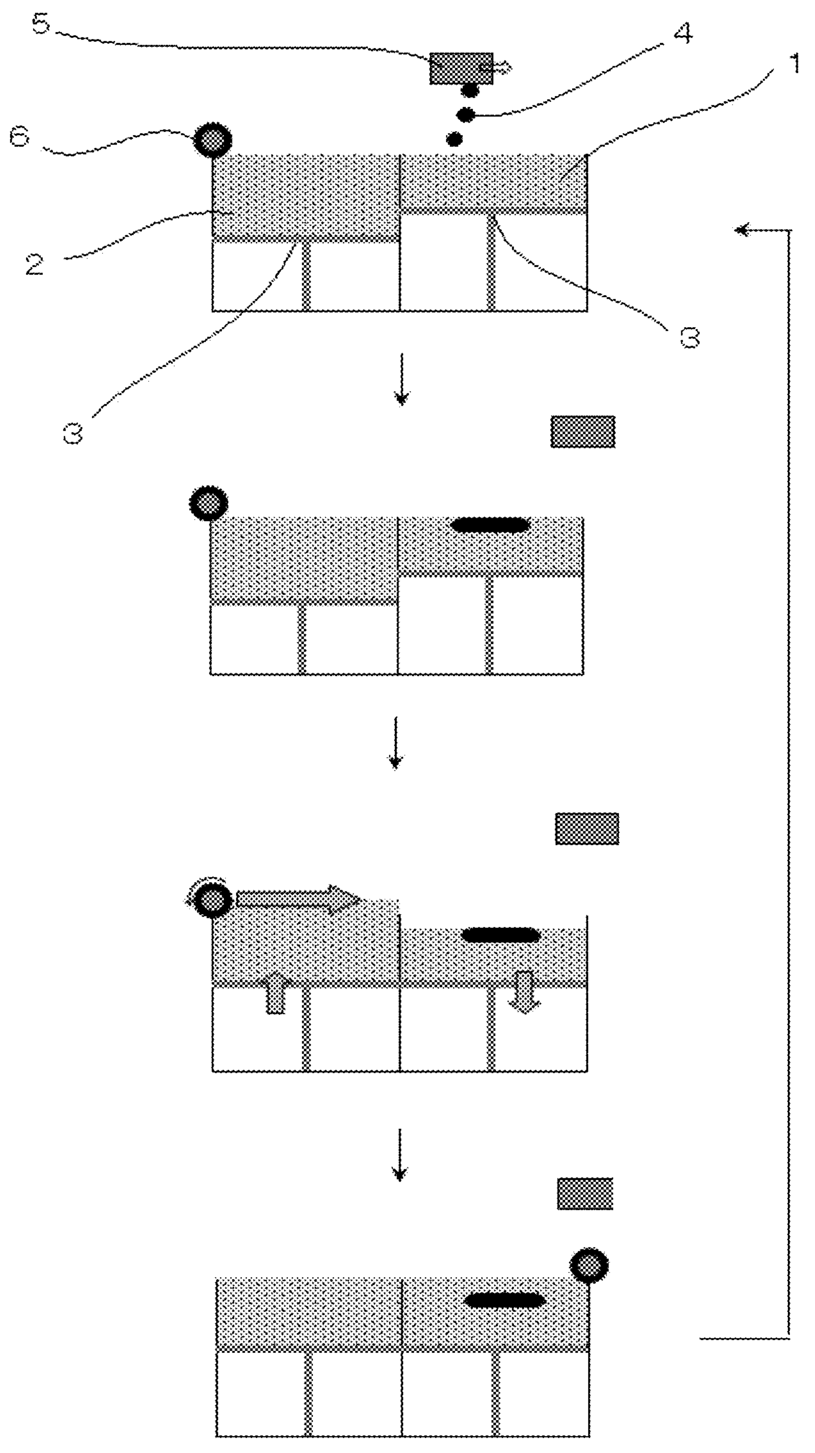
FIG. 1 is a schematic diagram illustrating an example of a powder layer stack producing apparatus of the present invention.

DETAILED DESCRIPTION OF THE INVENTION (Liquid Material for Forming Three-Dimensional Object)

A liquid material for forming a three-dimensional object of the present invention is adapted to harden a powder material for forming a three-dimensional object containing an organic material.

The liquid material for forming a three-dimensional object contains a solvent and a cross-linking agent, preferably contains a surfactant, and further contains other components according to necessity.

When the liquid material for forming a three-dimensional object is delivered to the organic material contained in the powder material for forming a three-dimensional object, the organic material dissolves in the solvent contained in the liquid material for forming a three-dimensional object and cross-links by the action of the cross-linking agent contained in the liquid material for forming a three-dimensional object.

A dynamic contact angle value can be used as an index for evaluation of wettability of the liquid material for forming a three-dimensional object over a film made of the organic material.

A dynamic contact angle of the liquid material for forming a three-dimensional object over a film made of the organic material is from 20° to 80°, and preferably from 24° to 77°. When the dynamic contact angle is 20° or greater, the liquid material has an adequate wettability over an inkjet head and hence a favorable jetting stability. When the dynamic contact angle is 80° or less, the liquid material has an adequate wettability over a film made of the organic material. This improves a binding force between the powder material particles and hence the strength of a resulting three-dimensional object.

Examples of known methods for measuring the dynamic contact angle include a drop method, an extension/contraction method, a sliding method, and Wilhelm method. In the present invention, the drop method is selected because what is evaluated is how a liquid droplet of the liquid material for forming a three-dimensional object lands on and permeates a film made of the organic material. The dynamic contact angle can be obtained by measuring temporal changes of the contact angle of the liquid droplet at intervals shorter than 1 second and reading the contact angle of the liquid droplet when the liquid droplet becomes no further parallel with the film.

—Solvent—

The solvent is not particularly limited, and an arbitrary solvent may be selected according to the purpose. Examples of the solvent include water and organic solvents. One of these may be used alone, or two or more of these may be used in combination. Among these, a mixture solvent of water and an organic solvent is preferable in terms of environmental hazardousness and jetting stability (i.e., a small temporal viscosity change) of the liquid material for forming a three-dimensional object in delivery of the liquid material by ink-jetting.

The water is not particularly limited, and arbitrary water may be selected according to the purpose. Examples of the water include pure water such as ion-exchanged water, ultrafiltrated water, reverse osmotic water, and distilled water, and ultrapure water.

A content of the water in the liquid material for forming a three-dimensional object is preferably from 40% by mass to 85% by mass, and more preferably from 50% by mass to 80% by mass. When the content of the water is 40% by mass or greater, the water can sufficiently dissolve a water-soluble polymer that may be used as the organic material contained in the powder material for forming a three-dimensional object. This improves the strength of a resulting hardened product. When the content of the water is 85% by mass or less, inkjet nozzles can be prevented from drying during a standby state and hence from clogging.

The organic solvent is not particularly limited, and an arbitrary organic solvent may be selected according to the purpose. Examples of the organic solvent include 1,2,6-hexanetriol, 1,2-butanediol, 1,2-hexanediol, 1,2-pentanediol, 1,3-dimethyl-2-imdazolidinone, 1,3-butanediol, 1,3-propanediol, 1,4-butanediol, 1,5-pentanediol, 1,6-hexanediol, 2,2-dimethyl-1,3-propanediol, 2,3-butanediol, 2,4-pentanediol, 2,5-hexanediol, 2-ethyl-1,3-hexanediol, 2-pyrrolidone, 2-methyl-1,3-propanediol, 2-methyl-2,4-pentanediol, 3-methyl-1,3-butanediol, 3-methyl-1,3-hexanediol, N-methyl-2-pyrrolidone, N-methyl pyrrolidinone, β-butoxy-N,N-dimethyl propion amide, ρ-methoxy-N,N-dimethyl propion amide, γ-butyrolactone, ε-caprolactam, ethylene glycol, ethylene glycol-n-butyl ether, ethylene glycol-n-propyl ether, ethylene glycol phenyl ether, ethylene glycol mono-2-ethyl hexyl ether, ethylene glycol monoethyl ether, glycerin, diethylene glycol, diethylene glycol-n-hexyl ether, diethylene glycol methyl ether, diethylene glycol monoethyl ether, diethylene glycol monobutyl ether, diethylene glycol monomethyl ether, diglycerin, dipropylene glycol, dipropylene glycol-n-propyl ether, dipropylene glycol monomethyl ether, dimethyl sulfoxide, sulfolane, thio diglycol, tetraethylene glycol, triethylene glycol, triethylene glycol ethyl ether, triethylene glycol dimethyl ether, triethylene glycol monobutyl ether, triethylene glycol methyl ether, tripropylene glycol, tripropylene glycol-n-propyl ether, tripropylene glycol methyl ether, trimethylol ethane, trimethylol propane, propyl propylene diglycol, propylene glycol, propylene glycol-n-butyl ether, propylene glycol-t-butyl ether, propylene glycol phenyl ether, propylene glycol monoethyl ether, hexylene glycol, polyethylene glycol, polypropylene glycol, aliphatic hydrocarbons, ketone-based solvents such as methyl ethyl ketone, and ester-based solvents such as ethyl acetate. One of these may be used alone, or two or more of these may be used in combination.

Among these, organic solvents having a vapor pressure of 10 mmHg or greater at 100° C. are preferable. Use of an organic solvent having a vapor pressure of 10 mmHg or greater at 100° C. provides a favorable drying property after object production and improves the strength of the three-dimensional object (hardened product). Preferable examples of such organic solvents include 3-methyl-1,3-butanediol, propylene glycol, 2,3-butanediol, 1,2-butanediol, and 1,3-butanediol.

A content of the organic solvent in the liquid material for forming a three-dimensional object is preferably from 10% by mass to 50% by mass, and more preferably from 20% by mass to 40% by mass. When the content is 10% by mass or greater, the liquid material for forming a three-dimensional object has an adequate water retaining force, and can avoid drying inkjet nozzles during a standby state and hence clogging the inkjet nozzles. When the content is 50% by mass or less, the liquid material for forming a three-dimensional object has an adequate viscosity and a favorable jetting stability, and can easily dry after three-dimensional object production and improve the strength of the three-dimensional object (hardened product).

—Cross-Linking Agent—

The cross-linking agent is not particularly limited, and an arbitrary cross-linking agent may be selected according to the purpose as long as such a cross-linking agent has a property of being able to cross-link the organic material. Examples of the cross-linking agent include metal salts, metal complexes, organozirconium-based compounds, organotitanium-based compounds, and chelate agents.

Examples of the organozirconium-based compounds include zirconium oxychloride, ammonium zirconium carbonate, and ammonium zirconium lactate.

Examples of the organotitanium-based compounds include titanium acylate and titanium alkoxide.

One of these may be used alone, or two or more of these may be used in combination. Among these, metal salts are preferable.

Preferable examples of the metal salts include metal salts that ionize to divalent or higher cationic metals. Preferable specific examples of the metal salts include zirconium oxychloride octahydrate (tetravalent), aluminium hydroxide (trivalent), magnesium hydroxide (divalent), titanium lactate ammonium salt (tetravalent), basic aluminium lactate (trivalent), zirconium carbonate ammonium salt (tetravalent), titanium triethanol aminate (tetravalent), glyoxylate, and zirconium lactate ammonium salt.

These metal salts may be commercially available products. Examples of the commercially available products include zirconium oxychloride octahydrate (zirconium oxychloride available from Daiichi Kigenso Kagaku Kogyo Co., Ltd.), aluminium hydroxide (available from Wako Pure Chemical Industries, Ltd.), magnesium hydroxide (available from Wako Pure Chemical Industries, Ltd.), titanium lactate ammonium salt (ORGATIX TC-300 available from Matsumoto Fine Chemical Co., Ltd.), zirconium lactate ammonium salt (ORGATIX ZC-300 available from Matsumoto Fine Chemical Co., Ltd.), basic aluminium lactate (available from Wako Pure Chemical Industries, Ltd.), a bis-vinyl sulfone compound (VS-B (K-FJC) available from Fuji Fine Chemical Co., Ltd.), zirconium carbonate ammonium salt (ZIRCOZOL AC-20 available from Daiichi Kigenso Kagaku Kogyo Co., Ltd.), titanium triethanol aminate (ORGATIX TC-400 available from Matsumoto Fine Chemical Co., Ltd.), glyoxylate (SAFELINK SPM-01 available from Nippon Synthetic Chemical Industry Co., Ltd.), and adipic acid dihydrazide (available from Otsuka Chemical Co., Ltd.). A metal salt having a metal valence of 2 or greater is preferable because such a metal salt can improve cross-linking strength and impart a favorable strength to the three-dimensional object obtained.

Preferable examples of ligands of the cationic metal include lactate ions because lactate ions can impart excellent jetting stability (temporal stability) to the liquid material for forming a three-dimensional object.

A cross-linking agent in which ligands of the cationic metal are carbonate ions, e.g., ammonium zirconium carbonate, tends to change in the properties as the cross-linking agent in an aqueous solution because such a cross-linking agent produces a self-polymerization reaction in an aqueous solution. Hence, use of a cross-linking agent in which ligands of the cationic metal are lactate ions is more preferable in terms of jetting stability of the liquid material for forming a three-dimensional object. However, addition of a chelate agent such as gluconic acid and triethanol amine makes it possible to suppress a self-polymerization reaction of ammonium zirconium carbonate in an aqueous solution and improve jetting stability of the liquid material for forming a three-dimensional object.

—Surfactant—

It is preferable to add the surfactant with a view to adjusting surface tension, etc. of the liquid material for forming a three-dimensional object.

Examples of the surfactant include anionic surfactants, nonionic surfactants, amphoteric surfactants, acetylene glycol-based surfactants, fluorosurfactants, and silicone-based surfactants.

Examples of the anionic surfactants include polyoxyethylene alkyl ether acetate salt, dodecyl benzene sulfonate, succinate ester sulfonate, laurate, and polyoxyethylene alkyl ether sulfate salt.

Examples of the nonionic surfactants include polyoxyethylene alkyl ether, polyoxyethylene polyoxypropylene alkyl ether, polyoxyethylene alkyl ester, polyoxyethylene polyoxypropylene alkyl ester, polyoxyethylene sorbitan fatty acid ester, polyoxyethylene alkyl phenyl ether, polyoxyethylene alkyl amine, and polyoxyethylene alkyl amide.

Examples of commercially available products of the nonionic surfactants include LATEMUL series such as LATEMUL PD420, 430, and 450 (available from Kao Corporation).

Examples of the amphoteric surfactants include lauryl amino propionate, lauryl dimethyl betaine, stearyl dimethyl betaine, and lauryl dihydroxy ethyl betaine.

The surfactants described above are not particularly limited, and arbitrary surfactants may be selected according to the purpose. Specific examples of the surfactants include lauryl dimethyl amine oxide, myristyl dimethyl amine oxide, stearyl dimethyl amine oxide, dihydroxy ethyl lauryl amine oxide, polyoxyethylene palm oil alkyl dimethyl amine oxide, dimethyl alkyl (palm) betaine, and dimethyl lauryl betaine.

These surfactants are readily available from surfactant manufacturers such as Nikko Chemicals Co., Ltd., Nihon Emulsion Co., Ltd., Nippon Shokubai Co., Ltd., Toho Chemical Industry Co., Ltd., Kao Corporation, Adeka Corporation, Lion Corporation, Aoki Oil Industrial Co., Ltd., and Sanyo Chemical Industries, Ltd.

The acetylene glycol-based surfactants are not particularly limited, and arbitrary acetylene glycol-based surfactants may be selected according to the purpose. Examples of the acetylene glycol-based surfactants include acetylene glycol types such as 2,4,7,9-tetramethyl-5-desine-4,7-diol, 3,6-dimethyl-4-octine-3,6-diol, and 3,5-dimethyl-1-hexin-3-ol (e.g., SURFYNOL 104, 82, 465, 485, or TG available from Air Products and Chemicals, Inc. (United States)). Among these, SURFYNOL 465, 104, and TG are preferable.

The fluorosurfactants are not particularly limited, and arbitrary fluorosurfactants may be selected according to the purpose. Examples of the fluorosurfactants include perfluoroalkyl sulfonate, perfluoroalkyl carboxylate, perfluoroalkyl phosphate ester, perfluoroalkyl ethylene oxide adduct, perfluoroalkyl betaine, a perfluoroalkyl amine oxide compound, a polyoxyalkylene ether polymer having a perfluoroalkyl ether group on a side chain or a sulfate ester salt of the polyoxyalkylene ether polymer having a perfluoroalkyl ether group on a side chain, and fluoro-aliphatic polymer ester.

The fluorosurfactants may be commercially available products. Examples of the commercially available products include SURFLON S-111, S-112, S-113, S-121, S-131, S-132, S-141, and S-145 (available from Asahi Glass Co., Ltd.), FLUORAD FC-93, FC-95, FC-98, FC-129, FC-135, FC-170C, FC-430, FC-431, and FC-4430 (available from Sumitomo 3M Limited), FT-110, 250, 251, and 400S (available from Neos Company Limited), ZONYL FS-62, FSA, FSE, FSJ, FSP, TBS, UR, FSO, FSO-100, FSN-N, FSN-100, FS-300, and FSK (available from Du Pont Kabushiki Kaisha), POLYFOX PF-136A, PF-156A, and PF-151N (available from Omnova Solutions Inc.), and UNIDYNE DSN-403N (available from Daikin Industries, Ltd.).

The silicone-based surfactants are not particularly limited, and arbitrary silicone-based surfactants may be selected according to the purpose. Examples of the silicone-based surfactants include BYK-345, BYK-346, BYK-347, and BYK-348 (available from Byk-Chemie GmbH).

The surfactant is not limited to the surfactants described above. One of the surfactants described above may be used alone, or two or more of these may be used as a mixture.

It is preferable that the surfactant be added in a total amount of from 0.01% by mass to 5% by mass, in order to exert an effect for permeation into the organic material coated with the powder material for forming a three-dimensional object. When the total amount of the surfactant is 0.01% by mass or greater, the surfactant has a sufficient effect of imparting wettability and can obtain a sufficient effect of improving permeability into the organic material coated with the powder material for forming a three-dimensional object. When the total amount of the surfactant is 5% by mass or less, storage stability is favorable.

<Other Components>

As the other components, additives such as a defoamer, an antiseptic/fungicide, a pH adjuster, a chelate agent, and an anti-rust agent may be added.

—Defoamer—

The defoamer is not particularly limited, and commonly used defoamers may also be used. Examples of the commonly used defoamers include silicone defoamers, polyether defoamers, and fatty acid ester defoamers. Combined use with one of these is possible, and combined use with two or more of these is also possible. Among these, silicone defoamers are preferable for combined use in terms of an excellent foam breaking effect.

Examples of the silicone defoamers include oil silicone defoamers, compound silicone defoamers, self-emulsifiable silicone defoamers, emulsion silicone defoamers, and modified silicone defoamers.

Examples of the modified silicone defoamers include amino-modified silicone defoamers, carbinol-modified silicone defoamers, methacrylic-modified silicone defoamers, polyether-modified silicone defoamers, alkyl-modified silicone defoamers, higher fatty acid ester-modified silicone defoamers, and alkylene oxide-modified silicone defoamers.

Among these, the self-emulsifiable silicone defoamers and the emulsion silicone defoamers are preferable.

The commonly used defoamers may be commercially available products. Examples of the commercially available products include silicone defoamers available from Shin-Etsu Chemical Co., Ltd. (e.g., KS508, KS531, KM72, and KM85), silicone defoamers available from Dow Corning Toray Co., Ltd. (e.g., Q2-3183A and SH5510), silicone defoamers available from NUC Corporation (e.g., SAG30), and defoamers available from Adeka Corporation (e.g., ADEKANATE series).

A content of the defoamer in the liquid material for forming a three-dimensional object is not particularly limited and may be appropriately selected according to the purpose. However, it is preferable to add the defoamer as little as possible, because many defoamers do not completely dissolve in the liquid material for forming a three-dimensional object but separate and deposit from the liquid material.

Nevertheless, if the liquid material for forming a three-dimensional object is foamed during packing, packability of the liquid material is poor. Hence, it is possible to add the defoamer in a smallest amount possible, and the content of the defoamer is preferably 3% by mass or less and more preferably 0.5% by mass or less. There are some defoamers that contain a commonly used defoamer in combination and also contain inorganic particles with a view to a higher foam breaking effect. However, it is preferable not to use such defoamers as the defoamer to be added in the liquid material for forming a three-dimensional object.

Antiseptic/Fungicide

Examples of the antiseptic/fungicide include sodium dehydroacetate, sodium sorbate, sodium 2-pyridinethiol-1-oxide, sodium benzoate, and pentachlorophenol sodium.

—pH Adjuster—

The pH adjuster is not particularly limited, and arbitrary substances may be used as long as such substances can adjust pH of the liquid material for forming a three-dimensional object to a desired level without adversely influencing the liquid material to which the substances are added. Examples of the pH adjuster include: amines, alkali metal hydroxides, hydroxides of quaternary compounds, and alkali metal carbonates for adjustment to basic levels; and inorganic acids and organic acids for adjustment to acidic levels.

Examples of the amines include amines such as diethanol amine and triethanol amine.

Examples of the alkali metal hydroxides include hydroxides of alkali metal elements such as lithium hydroxide, sodium hydroxide, and potassium hydroxide, and ammonium hydroxide.

Examples of the hydroxides of quaternary compounds include quaternary ammonium hydroxide and quaternary phosphonium hydroxide.

Examples of the alkali metal carbonates include lithium carbonate, sodium carbonate, and potassium carbonate.

Examples of the inorganic acids include a hydrochloric acid, a sulfuric acid, a nitric acid, a phosphoric acid, and a boric acid.

Examples of the organic acids include an acetic acid, an oxalic acid, a lactic acid, a salicylic acid, a benzoic acid, a glucuronic acid, an ascorbic acid, an arginine acid, cysteine, a fumaric acid, a maleic acid, a malonic acid, lysine, a malic acid, a citric acid, glycine, a glutamic acid, a succinic acid, a tartaric acid, a phthalic acid, a pyrrolidone carboxylic acid, a pyrone carboxylic acid, a pyrrole carboxylic acid, a furan carboxylic acid, a pyridine carboxylic acid, a coumarin acid, a thiophene carboxylic acid, a nicotinic acid, and a carborane acid, or derivatives of compounds of these.

Salts such as ammonium sulfate and ammonium phosphate that are produced from a monovalent weak cation may also be used.

The pH adjusters may be timely used when each of the pH adjusters has a temporary dissociation constant pKa that is optimum depending on the pH change-dependent characteristic of the liquid material for forming a three-dimensional object. One of the pH adjusters may be used alone, or two or more of these may be used in combination. The pH adjusters may be used in combination with a buffer agent. The pH adjusters are available from various manufacturers including Tokyo Chemical Industry Co., Ltd.

—Physical Properties of Liquid Material for Forming Three-Dimensional Object—

A viscosity of the liquid material for forming a three-dimensional object is preferably from 3 mPa·s to 20 mPa·s and more preferably from 5 mPa·s to 10 mPa·s at 25° C. When the viscosity is 3 mPa·s or higher or 20 mPa·s or lower, the liquid material for forming a three-dimensional object can be jetted from inkjet nozzles stably, and a hardened product produced by delivering the liquid material for forming a three-dimensional object to a layer of the powder material for forming a three-dimensional object obtains a sufficient strength and a favorable dimensional precision.

The viscosity can be measured according to, for example, JIS K7117.

A surface tension of the liquid material for forming a three-dimensional object is preferably 40 mN/m or less, and more preferably from 10 mN/m to 30 mN/m at 25° C. When the surface tension is 40 mN/m or less, the liquid material for forming a three-dimensional object can be jetted from inkjet nozzles stably, and a hardened product produced by delivering the liquid material for forming a three-dimensional object to a layer of the powder material for forming three-dimensional object obtains a sufficient strength and a favorable dimensional precision.

The surface tension can be measured with, for example, DY-300 available from Kyowa Interface Science Co., Ltd.

The liquid material for forming a three-dimensional object of the present invention can be used favorably for simple, efficient production of various three-dimensional objects, and can be used particularly favorably for a material set for forming a three-dimensional object, a three-dimensional object producing method, and a three-dimensional object producing apparatus of the present invention described below.

(Material Set for Forming Three-Dimensional Object)

A material set for forming a three-dimensional object of the present invention includes a powder material for forming a three-dimensional object and the above-described liquid material for forming a three-dimensional object of the present invention, and further includes other components, etc. according to necessity.

The liquid material for forming a three-dimensional object of the present invention contains a solvent and a cross-linking agent and further contains other components according to necessity as described above. The cross-linking agent may be included in the material set for forming a three-dimensional object of the present invention in the form of a solid instead of being included in the solvent. The material set for forming a three-dimensional object may be adapted such that the cross-linking agent is mixed with the solvent and prepared as a liquid when used.

<Powder Material for Forming Three-Dimensional Object>

The powder material for forming a three-dimensional object contains a base material and an organic material. A preferable powder material for forming a three-dimensional object contains a base material coated with an organic material. The powder material for forming a three-dimensional object further contains other components, etc. according to necessity.

—Base Material—

The base material is not particularly limited, and an arbitrary base material may be selected according to the purpose as long as such a base material has a form of a powder or particles. Examples of the constituent material of the base material include metals, ceramics, carbon, polymers, wood, bioaffinitive materials, and sand. In terms of obtaining a three-dimensional object having a high strength, metals and ceramics that can be sintered eventually are preferable.

Preferable examples of the metals includes stainless (SUS) steel, iron, copper, titanium, and silver. Examples of the stainless (SUS) steel include SUS316L.

Examples of the ceramics include metal oxides. Specific examples of the metal oxides include silica ($SiO_2$), alumina ($Al_2O_3$), zirconia ($ZrO_2$), and titania ($TiO_2$).

Examples of the carbon include graphite, graphene, carbon nanotube, carbon nanohorn, and fullerene.

Examples of the polymers include known water-insoluble resins.

Examples of the wood include wood chips and cellulose.

Examples of the bioaffinitive materials include a polylactic acid and calcium phosphate.

One of these materials may be used alone, or two or more of these may be used in combination.

In the present invention, commercially available particle or powder products made of these constituent materials may be used as the base material.

Examples of such commercially available products include SUS316L (PSS316L available from Sanyo Special Steel Co., Ltd.), $SiO_2$ (EXCELICA SE-15 available from Tokuyama Corporation), $AlO_2$ (TAIMICRON TM-5D available from Taimei Chemicals Co., Ltd.), and $ZrO_2$ (TZ-B53 available from Tosoh Corporation).

A known surface (reforming) treatment may be applied to the base material with a view to, for example, increasing affinity with the organic material.

A volume average particle diameter of the base material is not particularly limited and may be appropriately selected according to the purpose. However, the volume average particle diameter is preferably from 0.1 μm to 500 μm, more preferably from 5 μm to 300 μm, and yet more preferably from 15 μm to 250 μm.

When the volume average particle diameter is from 0.1 μm to 500 μm, efficiency of producing a three-dimensional object is excellent with favorable treatability and handleability. When the volume average particle diameter is 500 μm or less, a thin layer of the powder material for forming a three-dimensional object has an improved filling density of the powder material for forming a three-dimensional object. This makes it less likely for a three-dimensional object obtained to include voids, etc.

The volume average particle diameter of the base material can be measured with a known particle diameter measuring instrument, e.g., MICROTRAC HRA (available from Nikkiso Co., Ltd.) according to a known method.

A granularity distribution of the base material is not particularly limited and may be appropriately selected according to the purpose.

The contour, surface area, circularity, flowability, wettability, etc. of the base material may be appropriately selected according to the purpose.

—Organic Material—

The organic material may be any organic material that has a property of dissolving in the liquid material for forming a three-dimensional object and being cross-likable by the action of the cross-linking agent contained in the liquid material.

In the present invention, solubility of the organic material refers to such a solubility that when 1 g of the organic material is mixed and stirred in the liquid material for forming a three-dimensional object having a temperature of 30° C. per 100 g of the solvent contained in the liquid material, equal to or greater than 90% by mass of the organic material dissolves.

A viscosity of the organic material in a 4% by mass (w/w %) solution of the organic material at 20° C. is preferably 40 mPa·s or lower, more preferably from 1 mPa·s to 35 mPa·s, and particularly preferably from 5 mPa·s to 30 mPa·s.

When the viscosity is 40 mPa·s or lower, a hardened product (three-dimensional object) formed of (layers of) the powder material for forming a three-dimensional object and produced by delivering the liquid material for forming a three-dimensional object to the powder material for forming a three-dimensional object has an improved strength and is less likely to have problems such as a shape collapse during post-treatment or handling such as sintering. Further, the three-dimensional object formed of (layers of) the powder material for forming a three-dimensional object and produced by delivering the liquid material for forming a three-dimensional object to the powder material for forming a three-dimensional object tends to have an improved dimensional precision.

The viscosity can be measured according to, for example, JIS K7117.

The organic material is not particularly limited, and an arbitrary organic material may be selected according to the purpose. However, a water-soluble organic material is preferable in terms of handleability, environmental hazardousness, etc. Examples of such organic materials include water-soluble resins and water-soluble prepolymers. Use of such a water-soluble organic material in the powder material for forming a three-dimensional object allows use of water and an organic solvent as solvents in the liquid material for forming a three-dimensional object. Furthermore, such a water-soluble organic material can be easily separated from the base material by water treatment in disposal or recycling of the powder material.

Examples of the water-soluble resins include a polyvinyl alcohol resin, a polyacrylic acid resin, a cellulose resin, starch, gelatin, a vinyl resin, an amide resin, an imide resin, an acrylic resin, and polyethylene glycol.

These water-soluble resins may be a homopolymer or a heteropolymer (copolymer), may be modified, may have a known functional group incorporated, or may be in the form of a salt, as long as these water-soluble resins have water solubility.

Hence, the polyvinyl alcohol resin may be a polyvinyl alcohol, a polyvinyl alcohol modified with an acetoacetyl group, an acetyl group, silicone, etc. (e.g., an acetoacetyl group-modified polyvinyl alcohol, an acetyl group-modified polyvinyl alcohol, and a silicone-modified polyvinyl alcohol), or a butanediol vinyl alcohol copolymer, etc. The polyacrylic acid resin may be a polyacrylic acid or a salt such as sodium polyacrylate. The cellulose resin may be a cellulose or a carboxy methyl cellulose (CMC), etc. The acrylic resin may be a polyacrylic acid or an acrylic acid-maleic anhydride copolymer, etc.

Examples of the water-soluble prepolymers include an adhesive water-soluble isocyanate prepolymer contained in a water sealant, etc.

Examples of organic materials and resins that are not water-soluble include acrylic, a maleic acid, silicones, butyral, polyesters, polyvinyl acetate, a vinyl chloride/vinyl acetate copolymer, polyethylenes, polypropylene, polyacetal, an ethylene/vinyl acetate copolymer, an ethylene/(meth)acrylic acid copolymer, an α-olefin/maleic anhydride-based copolymer, an esterified product of an α-olefin/maleic anhydride-based copolymer, polystyrenes, poly(meth)acrylic acid esters, an α-olefin/maleic anhydride/vinyl group-containing monomer copolymer, a styrene/maleic anhydride copolymer, a styrene/(meth)acrylic acid ester copolymer, polyamides, epoxy resins, xylene resins, ketone resins, petroleum resins, rosin or derivatives of rosin, coumarone-indene resins, terpene resins, polyurethane resins, synthetic rubbers such as styrene/butadiene rubbers, polyvinyl butyral, nitrile rubbers, acrylic rubbers, and ethylene/propylene rubbers, and nitrocelluloses.

In the present invention, organic materials having a cross-linkable functional group are preferable among the organic materials described above. The cross-linkable functional group is not particularly limited, and an arbitrary cross-linkable functional group may be selected according to the purpose. Examples of the cross-linkable functional group include a hydroxyl group, a carboxyl group, an amide group, a phosphoric acid group, a thiol group, an acetoacetyl group, and an ether bond.

It is preferable that the organic material have the cross-linkable functional group, because this makes it easier for the organic material to be cross-linked and form a hardened product (three-dimensional object). Furthermore, it is preferable that the organic material be a modified polyvinyl alcohol that has a cross-linkable functional group incorporated into a molecule of the polyvinyl alcohol, as described above. Such a modified polyvinyl alcohol is particularly preferably an acetoacetyl group-modified polyvinyl alcohol. For example, when the polyvinyl alcohol has the acetoacetyl group, the metal in the cross-linking agent contained in the liquid material for forming a three-dimensional object acts to provide excellent bending strength by which the acetoacetyl group can form a complicated three-dimensional network structure (cross-linked structure) easily via the metal (i.e., the acetoacetyl group can be excellent in cross-linking reactivity).

One such acetoacetyl group-modified polyvinyl alcohol may be used alone, or two or more of such acetoacetyl group-modified polyvinyl alcohols different in properties such as viscosity and degree of saponification may be used in combination. It is more preferable to use an acetoacetyl group-modified polyvinyl alcohol resin having an average degree of polymerization of from 400 to 1,100.

One of the organic materials described above may be used alone, or two or more of these may be used in combination. The organic materials may be appropriately synthesized products or commercially available products.

Examples of the commercially available products include polyvinyl alcohols (PVA-205C and PVA-220C available from Kurary Co., Ltd.), a polyacrylic acid (JULIMER AC-10 available from Toagosei Co., Ltd.), sodium polyacrylate (JULIMER AC-103P available from Toagosei Co., Ltd.), acetoacetyl group-modified polyvinyl alcohols (GOHSENX Z-300, GOHSENX Z-100, GOHSENX Z-200, GOHSENX Z-205, GOHSENX Z-210, and GOHSENZ Z220 available from Nippon Synthetic Chemical Industry Co., Ltd.), carboxyl group-modified polyvinyl alcohols (GOHSENX T-330, GOHSENX T-350, and GOHSENX T-330T available from Nippon Synthetic Chemical Industry Co., Ltd.), a butanediol vinyl alcohol copolymer (NICHIGO G-POLYMER OKS-8041 available from Nippon Synthetic Chemical Industry Co., Ltd.), carboxy methyl cellulose (CELLOGEN 5A available from Daiichi Kogyo Co., Ltd.), starch (HI-STARD PSS-5 available from available from Sanwa Starch Co., Ltd.), and gelatin (BEMATRIX GELATIN available from Nitta Gelatin Inc.).

A coating thickness of the organic material over the base material as expressed in average thickness is preferably from 5 nm to 1,000 nm, more preferably from 5 nm to 500 nm, yet more preferably from 50 nm to 300 nm, and particularly preferably from 100 nm to 200 nm.

In the present invention, utilization of the hardening action of the cross-linking agent enables a coating thickness smaller than in the conventional products, and enables simultaneous satisfaction of strength and precision even with a thin coating.

When the average thickness as the coating thickness is 5 nm or greater, a hardened product (three-dimensional object) formed of (layers of) the powder material for forming a three-dimensional object and produced by delivering the liquid material for forming a three-dimensional object to the powder material for forming a three-dimensional object has an improved strength and will not have problems such as a shape collapse during post-treatment or handling such as sintering. When the average thickness is 1,000 nm or less, the hardened product (three-dimensional object) formed of (layers of) the powder material for forming a three-dimensional object and produced by delivering the liquid material for forming a three-dimensional object to the powder material for forming a three-dimensional object has an improved dimensional precision.

The average thickness can be measured with, for example, a scanning tunneling microscope (STM), atomic force microscope (AFM), and scanning electron microscope (SEM), after the powder material for forming a three-dimensional object is embedded in an acrylic resin or the like and the surface of the base material is exposed by etching or the like.

A coverage (area ratio) by the organic material over the surface of the base material is not particularly limited and may be appropriately selected according to the purpose. However, the coverage is preferably 15% or greater, more preferably 50% or greater, and particularly preferably 80% or greater.

When the coverage is 15% or greater, a hardened product (three-dimensional object) formed of (layers of) the powder material for forming a three-dimensional object and produced by delivering the liquid material for forming a three-dimensional object to the powder material for forming a three-dimensional object has a sufficient strength, and will not have problems such as a shape collapse during post-treatment or handling such as sintering. Further, the hardened product (three-dimensional object) formed of (layers of) the powder material for forming a three-dimensional object and produced by delivering the liquid material for forming a three-dimensional object to the powder material for forming a three-dimensional object has an improved dimensional precision.

The coverage can be measured by observing a photograph of the powder material for forming a three-dimensional object, calculating the ratio (%) of the area covered by the organic material to the whole area of the surface of each particle of the powder material for forming a three-dimensional object captured in the two-dimensional photograph, and averaging the ratios. Alternatively, the coverage can be measured by elemental mapping of the portion covered by the organic material based on energy dispersive X-ray spectrometry such as SEM-EDS.

—Other Components—

The other components are not particularly limited, and arbitrary components may be selected according to the purpose. Examples of the other components include fluidizers, fillers, leveling agents, and sintering aids. It is preferable that the powder material for forming a three-dimensional object contain a fluidizer, because this makes it possible to form a layer, etc. of the powder material for forming a three-dimensional object easily and efficiently. It is preferable that the powder material for forming a three-dimensional object contain a filler, because this makes it less likely for the hardened product (three-dimensional object) produced to include voids, etc. It is preferable that the powder material for forming a three-dimensional object contain a leveling agent, because this improves wettability of the powder material for forming a three-dimensional object and facilitates handling, etc. It is preferable that the powder material for forming a three-dimensional object contain a sintering aid, because this makes it possible for the hardened product (three-dimensional object) produced to be sintered at a lower temperature in a sintering treatment.

—Production of Powder Material for Forming Three-Dimensional Object—

A method for producing the powder material for forming a three-dimensional object is not particularly limited, and an arbitrary method may be selected according to the purpose. Preferable examples of the method include a method for coating the base material with the organic material according to a known coating method.

The method for coating the surface of the base material with the organic material is not particularly limited, and an arbitrary method may be selected from known coating methods. Preferable examples of such known coating methods include tumbling fluidized bed coating, spray drying, a stirring mixing adding method, dipping, and kneader coating. These coating methods can be carried out with known commercially available various coaters and granulators.

—Physical Properties of Powder Material for Forming Three-Dimensional Object—

An average particle diameter of the powder material for forming a three-dimensional object is not particularly limited and may be appropriately selected according to the purpose. However, the average particle diameter is preferably from 3 μm to 250 μm, more preferably from 3 μm to 200 μm, yet more preferably from 5 μm to 150 μm, and particularly preferably from 10 μm to 85 μm.

When the average particle diameter is 3 μm or greater, the powder material has an improved flowability. This makes it easier to form a powder material layer and improves smoothness of the surface of layers stacked. Hence, there is a tendency that the object producing efficiency, treatability/handleability, and dimensional precision are improved. When the average particle diameter is 250 μm or less, the space between the powder material particles is small. This provides a small voidage in the object and contributes to enhancement of the strength. Hence, an average particle diameter range of from 3 μm to 250 μm is preferable for simultaneous satisfaction of dimensional precision and strength.

A granularity distribution of the powder material for forming a three-dimensional object is not particularly limited and may be appropriately selected according to the purpose.

A repose angle of the powder material for forming a three-dimensional object is preferably 60° or less, more preferably 50° or less, and yet more preferably 40° or less.

When the repose angle is 60° or less, the powder material for forming a three-dimensional object can be stably placed at a desired location over a support member efficiently.

The repose angle can be measured with, for example, a powder characteristic measuring instrument (POWDER TESTER PT-N TYPE available from Hosokawa Micron Corporation).

The powder material for forming a three-dimensional object can be used favorably for simple, efficient production of various objects, and can be used particularly favorably for a three-dimensional object producing method and a three-dimensional object producing apparatus of the present invention described below.

It is possible to produce a structure having a complicated three-dimensional shape easily, efficiently, and with a good dimensional precision, only by delivering the liquid material for forming a three-dimensional object of the present invention to the powder material for forming a three-dimensional object of the present invention. The structure produced in this way is a hardened product (three-dimensional object) having a sufficient hardness, and is excellent in treatability and handleability without having a shape collapse even when held in a hand, brought into or out from a mold, or blown with air for any excess of the powder material for forming a three-dimensional object to be removed. The hardened product may be used as it is, or as a hardened product to be sintered, may be subjected to a sintering treatment to be produced as a sintered body of the three-dimensional object. Through the sintering treatment, a dense sintered body including few voids and having a beautiful appearance can be obtained easily.

<Three-Dimensional Object>

It is possible to produce a structure having a complicated, highly-strong three-dimensional shape easily, efficiently, and with a good dimensional precision, only by making the liquid material for forming a three-dimensional object of the present invention act on the powder material for forming a three-dimensional object. The structure produced in this way is a hardened product (three-dimensional object) having a sufficient hardness, and is excellent in treatability and handleability without having a shape collapse even when held in a hand, brought into or out from a mold, or blown with air for any excess of the powder material for forming a three-dimensional object to be removed. The hardened product may be used as it is, or as a hardened product to be sintered, may be subjected to a sintering treatment to be produced as a sintered body of the three-dimensional object. Through the sintering treatment, a dense sintered body including few voids and having a beautiful appearance can be obtained easily.

A ratio of space in the sintered body obtained by sintering the three-dimensional object is 10% or lower, and preferably 7% or lower. When the ratio of space is 10% or lower, the sintered body includes few voids and is dense.

The ratio of space can be calculated according to, for example, Ratio of space=[1−(density obtained according to Archimedean method/real density)]×100. The Archimedean density can be measured with MS-DNY-54 available from Mettler-Toledo International Inc. The real density can be obtained depending on the constituent material of the base material, etc. used.

(Producing Method and Producing Apparatus for Three-Dimensional Object)

A three-dimensional object producing method of the present invention includes a powder material layer forming step and a liquid material delivering step, and further includes other steps such as a sintering step according to necessity.

The three-dimensional object producing method repeats the powder material layer forming step and the liquid material delivering step to produce a three-dimensional object.

A three-dimensional object producing apparatus of the present invention includes a powder material layer forming unit, a liquid material delivering unit, a powder material container storing a powder material, and a liquid material container storing a liquid material for forming a three-dimensional object, and further includes other units such as a liquid material supplying unit and a sintering unit according to necessity.

—Powder Material Layer Forming Step and Powder Material Layer Forming Unit—

The powder material layer forming step is a step of forming a layer of a powder material for forming a three-dimensional object containing an organic material and a base material.

The powder material layer forming unit is a unit configured to form a layer of a powder material for forming a three-dimensional object containing an organic material and a base material.

It is preferable that the layer of the powder material for forming a three-dimensional object be formed over a support member.

——Support Member——

The support member is not particularly limited, and an arbitrary support member may be selected according to the purpose as long as such a support member is a member over which the powder material for forming a three-dimensional object can be placed. Examples of the support member include a table having a placing surface over which the powder material for forming a three-dimensional object is placed, and a base plate of the apparatus illustrated in FIG. 1 of JP-A No. 2000-328106.

The surface of the support member, i.e., the placing surface over which the powder material for forming a three-dimensional object is placed may be a smooth surface, a coarse surface, a planar surface, or a curved surface. However, it is preferable that affinity of the placing surface with the organic material contained in the powder material for forming a three-dimensional object be low when the organic material dissolves and is cross-linked by the action of the cross-linking agent.

It is preferable that affinity between the placing surface and the dissolved cross-linked organic material be lower than affinity between the base material and the dissolved cross-linked organic material, because this makes it easy to remove the produced three-dimensional object from the placing surface.

——Formation of Powder Material Layer——

A method for placing the powder material for forming a three-dimensional object over the support member is not particularly limited, and an arbitrary method may be selected according to the purpose. Preferable example methods for placing the powder material for forming a three-dimensional object into, for example, a thin layer include a method using a known counter rotating mechanism (counter roller) employed in a selective laser sintering method described in Japanese Patent (JP-B) No. 3,607,300, a method for spreading the powder material for forming a three-dimensional object into a thin layer with such a member as a brush, a roller, and a blade, a method for pressing the surface of the powder material for forming a three-dimensional object with a pressing member to spread the powder material for forming a three-dimensional object into a thin layer, and a method using a known powder layer stacking apparatus.

The following manner may be followed to place the powder material for forming a three-dimensional object over the support member with the counter rotating mechanism (counter roller), the brush, the roller, and the blade, the pressing member, etc.

That is, with the counter rotating mechanism (counter roller), the brush, the roller, and the blade, the pressing member, etc., the powder material for forming a three-dimensional object is placed over the support member that is disposed within an outer frame (may be referred to as "mold", "hollow cylinder", "tubular structure", or the like) in a manner that the support member can lift upward and downward while sliding against the inner wall of the outer frame. When the support member used is one that can lift upward and downward within the outer frame, the support member is disposed at a height slightly lower than the upper-end opening of the outer frame, i.e. at a height lower by an amount corresponding to the thickness of a layer of the powder material for forming a three-dimensional object, and then the powder material for forming a three-dimensional object is placed over the support member. In this way, the powder material for forming a three-dimensional object can be placed into a thin layer over the support member.

When the liquid material for forming a three-dimensional object is caused to act on the powder material for forming a three-dimensional object placed into a thin layer in the way described above, the layer is hardened (the liquid material delivering step).

When the powder material for forming a three-dimensional object is placed into a thin film over the obtained hardened product of the thin layer in the same way as described above and the liquid material for forming a three-dimensional object is caused to act on the (layer of) the powder material for forming a three-dimensional object placed into the thin layer, hardening occurs. This hardening takes place not only in the (layer of) the powder material for forming a three-dimensional object placed into the thin layer, but also in the underlying hardened product of the thin layer obtained in the earlier hardening. As a result, a hardened product (three-dimensional object) having a thickness corresponding to about two layers of the powder material for forming a three-dimensional object is obtained.

An automatic simple method using the known powder layer stacking apparatus is also available to place the powder material for forming a three-dimensional object into a thin layer over the support member. The powder layer stacking apparatus typically includes a recoater configured to stack layers of the powder material for forming a three-dimensional object, a movable supplying tank configured to supply the powder material for forming a three-dimensional object over the support member, and a movable forming tank in which layers are stacked. In the powder layer stacking apparatus, it is possible to constantly place the surface of the supplying tank at a height slightly higher than the surface of the forming tank, by lifting the supplying tank upward, lifting the forming tank downward, or both, it is possible to actuate the recoater from the supplying tank side and place the powder material for forming a three-dimensional object into a thin layer, and it is also possible to stack thin layers of the powder material for forming a three-dimensional object, by repeatedly moving the recoater.

The thickness of a layer of the powder material for forming a three-dimensional object is not particularly limited and may be appropriately selected according to the purpose. An average thickness per layer is preferably from 30 μm to 500 μm, and more preferably from 60 μm to 300 μm.

When the thickness is 30 μm or greater, a hardened product (three-dimensional object) formed of (layers of) the powder material for forming a three-dimensional object and produced by delivering the liquid material for forming a three-dimensional object to the powder material for forming a three-dimensional object has a sufficient strength, and will not have problems such as a shape collapse during post-treatment or handling such as sintering. When the thickness is 500 μm or less, the hardened product (three-dimensional object) formed of (layers of) the powder material for forming a three-dimensional object and produced by delivering the liquid material for forming a three-dimensional object to the powder material for forming a three-dimensional object has an improved dimensional precision.

The average thickness is not particularly limited and can be measured according to a known method.

—Liquid Material Delivering Step and Liquid Material Delivering Unit—

The liquid material delivering step is a step of delivering a liquid material for forming a three-dimensional object containing a cross-linking agent cross-linkable with the organic material to a layer of the powder material formed in the powder material layer forming step to harden a predetermined region of the layer of the powder material.

The liquid material delivering unit is a unit configured to deliver a liquid material for forming a three-dimensional object containing a cross-linking agent cross-linkable with the organic material in order to harden a predetermined region of a layer of the powder material for forming a three-dimensional object formed by the powder material layer forming unit.

A method for delivering the liquid material for forming a three-dimensional object to the powder material layer is not particularly limited, and an arbitrary method may be selected according to the purpose. Examples of the method include a dispenser method, a spray method, and an inkjet method. Known apparatuses can be used favorably as the liquid material delivering unit to carry out these methods.

Among these, the dispenser method has excellent liquid droplet quantitativity, but has a small coating coverage. The spray method can form a minute jet of the materials easily and has a wide coating coverage and excellent coatability, but has a poor liquid droplet quantitativity and causes powder scattering due to a spray current. Hence, in the present invention, the inkjet method is particularly preferable. The inkjet method is preferable because the inkjet method is better than the spray method in liquid droplet quantitativity, can obtain a greater coating coverage than can be obtained by the dispenser method, and can form a complicated three-dimensional shape with a good precision efficiently.

In the case of the inkjet method, the liquid material delivering unit includes nozzles capable of delivering the liquid material for forming a three-dimensional object to the layer of the powder material by the inkjet method. Nozzles (jetting heads) of a known inkjet printer can be favorably used as the nozzles, and the inkjet printer can be favorably used as the liquid material delivering unit. Preferable examples of the inkjet printer include SG7100 available from Ricoh Company, Ltd. The inkjet printer is preferable because the inkjet printer can realize rapid coating owing to the capability of dropping the liquid material for forming a three-dimensional object from the head in a large amount at a time and covering a large coating coverage.

In the present invention, use of the inkjet printer capable of delivering the liquid material for forming a three-dimensional object of the present invention precisely and highly efficiently is advantageous in that: the nozzles or the nozzle heads of the inkjet printer will not be clogged or corroded because the liquid material for forming a three-dimensional object is free of solid matters such as particles and macromolecular high-viscosity materials such as resins; efficiency of producing a three-dimensional object is excellent because delivering (jetting) of the liquid material for forming a three-dimensional object onto a layer of the powder material for forming a three-dimensional object facilitates efficient permeation of the liquid material for forming a three-dimensional object into the organic material contained in the powder material for forming a three-dimensional object; and a cross-linked product having a good dimensional precision can be obtained easily, in a short time, and efficiently because unexpected volume increase or the like will not occur because there is no delivery of macromolecular components such as resins.

The cross-linking agent can also function as a pH adjuster in the liquid material for forming a three-dimensional object. When the inkjet method is used to deliver the liquid material for forming a three-dimensional object to a layer of the powder material for forming a three-dimensional object, the pH of the liquid material for forming a three-dimensional object is preferably from 5 (weakly acidic) to 12 (basic), and more preferably from 8 (weakly basic) to 10 (weakly basic), in terms of preventing corroding and clogging of the nozzle head portions of the nozzles used. For the pH adjustment, a known pH adjuster may be used.

—Powder Material Container—

The powder material container is a member storing the powder material for forming a three-dimensional object. The size, shape, constituent material, etc. of the powder material container are not particularly limited and may be appropriately selected according to the purpose. Examples of the powder material container include a storing reservoir, a bag, a cartridge, and a tank.

—Liquid Material Container—

The liquid material container is a member storing the liquid material for forming a three-dimensional object. The size, shape, constituent material, etc. of the liquid material container are not particularly limited and may be appropriately selected according to the purpose. Examples of the liquid material container include a storing reservoir, a bag, a cartridge, and a tank.

—Other Steps and Other Units—

Examples of the other steps include a drying step, a sintering step, a surface protection treatment step, and a painting step.

Examples of the other units include a drying unit, a sintering unit, a surface protection treatment unit, and a painting unit.

The drying step is a step of drying a hardened product (three-dimensional object) obtained in the liquid material delivering step. In the drying step, not only may the water contained in the hardened product be removed, but also any organic material contained in the hardened product may be removed (dewaxed). Examples of the drying unit include known dryers.

The sintering step is a step of sintering the hardened product (three-dimensional object) obtained in the liquid material delivering step. Through the sintering step, the hardened product can be made into a sintered three-dimensional object formed of an integrated metal or ceramic. Examples of the sintering unit include known sintering furnaces.

The surface protection treatment step is a step of performing formation, etc. of a protective layer over the hardened product (three-dimensional object) formed in the liquid material delivering step. With the surface protection treatment step, durability or the like that, for example, enables the hardened product (three-dimensional object) to be used as it is can be imparted to the surface of the hardened product (three-dimensional object). Specific examples of the protective layer include a water-resistant layer, a weatherable layer, a light-resistant layer, a heat-insulating layer, and a gloss layer. Examples of the surface protection treatment unit include known surface protection treatment apparatuses such as spray apparatuses and coating apparatuses.

The painting step is a step of painting the hardened product (three-dimensional object) formed in the liquid material delivering step. With the painting step, the hardened product (three-dimensional object) can be colored in a desired color. Examples of the painting unit include known painting apparatuses such as painting apparatuses using a spray, a roller, a brush, etc.

FIG. 1 illustrates an example of a powder layer stack producing apparatus. The powder layer stack producing apparatus of FIG. 1 includes a forming-side powder storing tank 1 and a supplying-side powder storing tank 2. These powder storing tanks each include a stage 3 movable upward and downward and store a powder material for forming a three-dimensional object over the stage.

The powder layer stack producing apparatus includes an inkjet head 5 that is disposed above the forming-side powder storing tank 1 and configured to jet a liquid material 4 for forming a three-dimensional object toward the powder material for forming a three-dimensional object in the forming-side powder storing tank 1. The powder layer stack producing apparatus also includes a leveling mechanism 6 (hereinafter may be referred to as recoater) configured to supply the powder material for forming a three-dimensional object from the supplying-side powder storing tank 2 to the forming-side powder storing tank 1 and level the surface of the powder material for forming a three-dimensional object in the forming-side powder storing tank 1.

The liquid material 4 for forming a three-dimensional object is dropped from the inkjet head 5 onto the powder material for forming a three-dimensional object in the forming-side powder storing tank 1. The position to which the liquid material 4 for forming a three-dimensional object is dropped is determined based on two-dimensional image data (slice data) representing a plurality of planer layers into which a three-dimensional shape finally desired is sliced.

When printing of one layer is completed, the stage 3 of the supplying-side powder storing tank 2 is lifted up, and the stage 3 of the forming-side powder storing tank 1 is lifted down, which produces a height difference. An amount of the powder material for forming a three-dimensional object corresponding to the height difference is moved to the forming-side powder storing tank 1 by the leveling mechanism 6.

In this way, a new layer of the powder material for forming a three-dimensional object is formed over the surface of the powder material for forming a three-dimensional object printed before. The thickness of one layer of the powder material for forming a three-dimensional object is from about several ten μm to 100 μm.

Then, printing is performed over the newly formed layer of the powder material for forming a three-dimensional object based on the slice data of the second layer. This serial process is repeated to obtain an object. The object is heated and dried by an unillustrated heating unit to obtain a final object.

Figure 2:
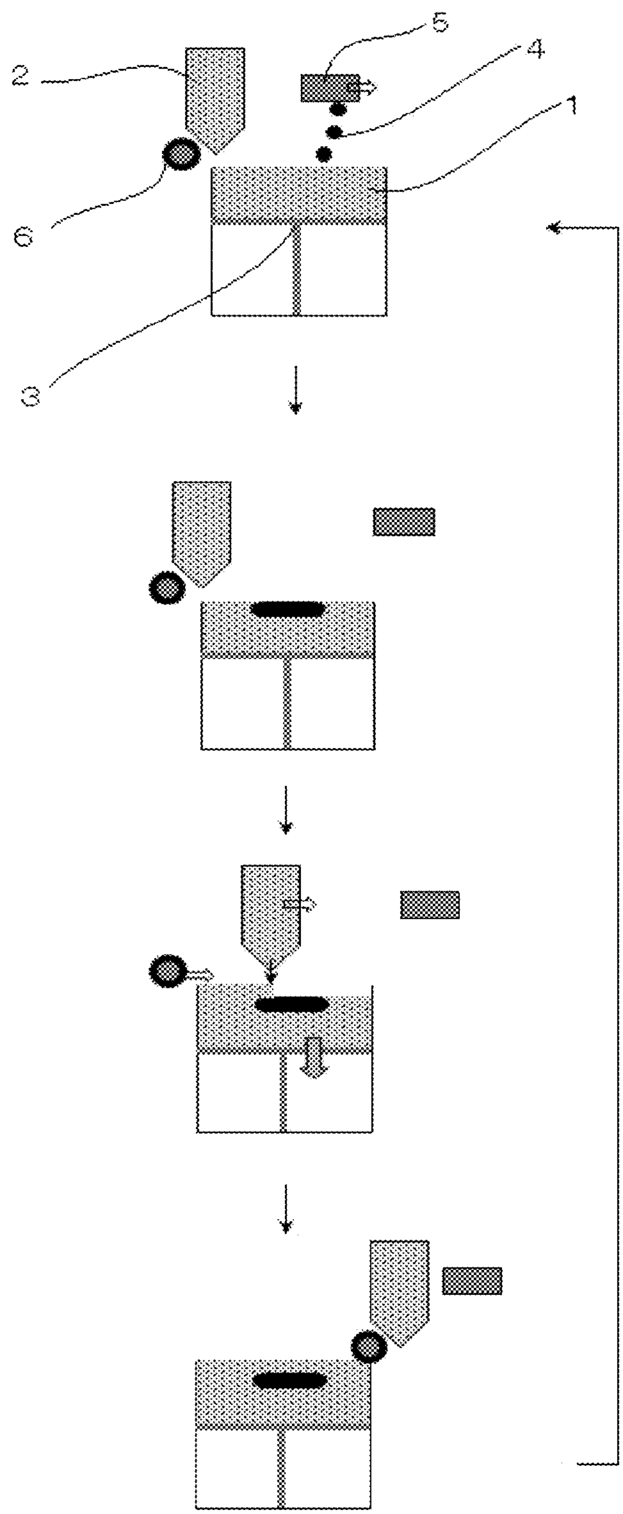
FIG. 2 is a schematic diagram illustrating another example of a powder layer stack producing apparatus of the present invention.

FIG. 2 illustrates another example of a powder layer stack producing apparatus of the present invention. The powder layer stack producing apparatus of FIG. 2 is identical with the powder layer stack producing apparatus of FIG. 1 in principle but different from the powder layer stack producing apparatus of FIG. 1 in the mechanism of supplying the powder material for forming a three-dimensional object. That is, the supplying-side powder storing tank 2 is disposed above the forming-side powder storing tank 1. When one layer is printed, the stage 3 of the forming-side powder storing tank 1 lifts down by a predetermined amount, and the supplying-side powder storing tank 2 moves while dropping the powder material for forming a three-dimensional object into the forming-side powder storing tank 1 in a predetermined amount to form a new layer of the powder material for forming a three-dimensional object. After this, the leveling mechanism 6 compresses the powder material for forming a three-dimensional object to increase the bulk density, and levels off the powder material for forming a three-dimensional object to the uniform height.

The powder layer stack producing apparatus having the configuration of FIG. 2 can be made smaller in size than the powder layer stack producing apparatus of FIG. 1 in which two powder storing tanks are arranged horizontally.

The above-described three-dimensional object producing method and producing apparatus of the present invention can produce a three-dimensional object having a complicated stereoscopic (three-dimensional (3D)) shape with the above-described powder material for forming a three-dimensional object or material set for forming a three-dimensional object of the present invention easily, efficiently, without the risk of a shape collapse before sintering, etc., and with a good dimensional precision.

The three-dimensional object produced in this way has a sufficient strength and excellent dimensional precision, can provide a dense sintered body including few voids, and can reproduce minute asperity, curved surfaces, etc. Therefore, the three-dimensional object is excellent in aesthetic appearance, has a high quality, and can be favorably used for various purposes.

EXAMPLES

Examples of the present invention will be described below. However, the present invention is not limited to these Examples by any means.

Production Example 1 of Powder Material for Forming Three-Dimensional Object —Preparation of Coating Liquid 1—

114 parts by mass of water and 6 parts by mass of a polyvinyl alcohol (G1028 available from Nippon Synthetic Chemical Industry Co., Ltd.), which was a water-soluble resin as the organic material, were mixed and stirred with a three-one motor (BL600 available from Shinto Scientific Co., Ltd.) for 1 hour while being heated to 80° C. in a water bath, to dissolve the polyvinyl alcohol in the water and prepare 120% by mass of a 5% by mass polyvinyl alcohol aqueous liquid. The preparation liquid produced in this way was used as a coating liquid 1.

The viscosity of the polyvinyl alcohol in a 4% by mass (w/w %) aqueous liquid at 20° C. was measured with a viscometer (DV-E VISCOMETER HADVE 115 TYPE, which was a rotary viscometer available from Brookfield Engineering Laboratories). As a result, the viscosity was from 5.0 mPa·s to 6.0 mPa·s.

—Coating of Coating Liquid 1 Over Surface of Base Material—

Next, with a commercially available coating apparatus (MP-01 available from Powrex Corp.), 100 parts by mass of a powder of a stainless steel (SUS316L) (PSS316L available from Sanyo Special Steel Co., Ltd., with a volume average particle diameter of 12 μm) was coated with the coating liquid 1 to a coating thickness (average thickness) of 100 nm. Half way through this coating, the coating thickness (average thickness) of the coating liquid 1 was sampled at appropriate timings to adjust the coating time and intervals appropriately to obtain a coating thickness (average thickness) of the coating liquid 1 of 100 nm and a coating coverage (%) of 100%. In the way described above, a powder material 1 for forming a three-dimensional object was produced. Methods for measuring the coating thickness and the surface coating coverage and conditions of the coating are presented below.

<Coating Thickness (Average Thickness)>

For measurement of the coating thickness, the surface of the powder material 1 for forming a three-dimensional object was polished with emery paper, and then lightly polished with a cloth impregnated with water to dissolve the resin portion and produce a sample for observation. Next, the exposed and surfaced boundary portion between the base material portion and the resin portion was observed with a Field Emission Scanning Electron Microscope (FE-SEM), and the length between the surface of the resin portion and the boundary portion was measured as a coating thickness. An average value of ten measurement points was calculated as the coating thickness (average thickness).

<Surface Coating Coverage>

With a Field Emission Scanning Electron Microscope (FE-SEM), a reflected electron image (ESB) was captured under the conditions described below under a viewing field setting that enabled about ten particles of the powder material 1 for forming a three-dimensional object to fall within the imaging window. The reflected electron image was then binarized according to image processing by IMAGEJ software. The coverage was calculated according to the area of black portions per particle/(area of black portions+area of white portions)×100, where black portions were coated portions and white portions were base material portions. A hundred particles were measured, and the average value of the hundred particles was calculated as the surface coating coverage (%).

—SEM Observation Conditions—

- Signal: ESB (reflected electron image)
- EHT: 0.80 kV
- ESB Grid: 700 V
- WD: 3.0 mm
- Aperture Size: 30.00 μm
- Contrast: 80%
- Magnification: set for each sample such that about ten particles fell within the imaging window in the lateral direction <Coating Conditions>

Spray Settings
- Nozzle type: 970
- Nozzle caliber: 1.2 mm
- Coating liquid jetting pressure: 4.7 Pa·s
- Coating liquid jetting rate: 3 g/min
- Amount of air atomized: 50 NL/min Rotor Settings
- Rotor type: M-1
- Rotational speed: 60 rpm
- Number of rotations: 400%

Air Current Settings
- Air feeding temperature: 80° C.
- Air flow rate: 0.8 $m^3$/min
- Filtering pressure of a bag filter: 0.2 MPa
- Filtering time of a bag filter: 0.3 seconds
- Bag filter intervals: 5 seconds Coating Time: 40 Minutes The volume average particle diameter of the produced powder material 1 for forming a three-dimensional object was measured with a commercially available particle diameter measuring instrument (MICROTRAC HRA available from Nikkiso Co., Ltd.). As a result, the volume average particle diameter was 13.5 μm. For flowability, the repose angle of the powder material 1 for forming a three-dimensional object was measured with a commercially available repose angle measuring instrument (POWDER TESTER PT-N TYPE available from Hosokawa Micron Corporation). As a result, the repose angle was 56.6°. A larger repose angle measurement tends to mean a poorer flowability.

Production Example 2 of Powder Material for Forming Three-Dimensional Object —Preparation of Coating Liquid 2—

A coating liquid 2 was prepared in the same manner as in the production example 1 of the powder material for forming a three-dimensional object, except that the polyvinyl alcohol (G1028 available from Nippon Synthetic Chemical Industry Co., Ltd.) used in the production example 1 of the powder material for forming a three-dimensional object was changed to a diacetone acrylamide-modified polyvinyl alcohol (DF05 available from Japan Vam & Poval Co., Ltd.).

Next, a powder material 2 for forming a three-dimensional object was produced in the same manner as in the production example 1 of the powder material for forming a three-dimensional object, except that the coating liquid 2 obtained above was used.

The volume average particle diameter of the produced powder material 2 for forming a three-dimensional object was measured in the same manner as in the production example 1 of the powder material for forming a three-dimensional object, and was 18.1 μm. The repose angle of the produced powder material 2 for forming a three-dimensional object was measured in the same manner as in the production example 1 of the powder material for forming a three-dimensional object, and was 53.6°.

Examples 1 to 12 and Comparative Examples 1 to 3

Preparation of Liquid Material for Forming Three-Dimensional Object

The materials presented in Table 1 to Table 4 were blended, and stirred with a magnetic stirrer for 30 minutes to prepare liquid materials for forming a three-dimensional object of Examples 1 to 12 and Comparative Examples 1 to 3 presented in Table 1 to Table 4. The blending amount of each material presented in Table 1 to Table 4 are in % by mass.

Properties of the produced liquid materials for forming a three-dimensional object were evaluated in the manners described below. The results are collectively presented in Table 1 to Table 4.

<Dynamic Contact Angle>

The coating liquids 1 and 2 were dropped onto a glass slide and applied over the glass slide with a silicone rubber squeegee to a coating amount of from 0.001 mg/mm$^2$ to 0.01 mg/mm$^2$. After the application, the glass slide was dried in a thermostat bath of 80° C. for 1 hour, taken out from the thermostat bath, and left under an atmosphere of 23° C. and 50% RH for 3 hours to produce coating film samples 1 and 2.

With an apparatus configured to perform automatic curve fitting of a liquid droplet image and measure a dynamic contact angle (OCA20 available from Dataphysics Corporation), the dynamic contact angle of each liquid material for forming a three-dimensional object when the liquid material for forming a three-dimensional object was dropped in an amount of 6 μL onto each coating film sample was measured from a liquid droplet image of the liquid material for forming a three-dimensional object captured with a CCD camera. A dynamic contact angle at a timing that was 2,000 ins after the liquid material for forming a three-dimensional object landed on the coating film sample was read from the obtained data.

<Viscosity>

The viscosity of each liquid material for forming a three-dimensional object was measured at 25° C. with an R-type viscometer (available from Toki Sangyo Co., Ltd.).

<Surface Tension>

The surface tension of each liquid material for forming a three-dimensional object was measured at 23°±3° with a static surface tensiometer (BVP-Z available from Kyowa Interface Science Co., Ltd.).

<pH>

The pH of each liquid material for forming a three-dimensional object was measured at 25° C. with a pH meter (HM30R available from DKK-Toa Corporation).

<Evaluation of Continuous Jetting Stability of Liquid Material for Forming Three-Dimensional Object>

Each liquid material for forming a three-dimensional object was colored with a dye (1% by mass of rhodamine), set in a cartridge, used for continuous printing of 200 sheets at a resolution of 600 dpi with an inkjet printer (IPSIO GXE5500 available from Ricoh Company, Ltd.), and evaluated based on the criteria below in terms of conditions of jetting disorder and empty jetting.

[Evaluation Criteria]

A: No jetting disorder or empty jetting was observed at all.

B: Jetting disorder or empty jetting was observed from 50 or less nozzles.

C: Jetting disorder or empty jetting was observed from 51 or more nozzles.

<Evaluation of Jettability of Liquid Material for Forming Three-Dimensional Object after Still Standing>

Each liquid material for forming a three-dimensional object was colored with a dye (1% by mass of rhodamine), set in a cartridge, used for printing with an inkjet printer (IPSIO GXE5500 available from Ricoh Company, Ltd.), and then stood still for 18 hours. Then, each liquid material for forming a three-dimensional object was output from the nozzles without a cleaning operation and evaluated based on the criteria below in terms of conditions of jetting disorder and empty jetting.

A: No jetting disorder or empty jetting was observed at all.

B: Jetting disorder or empty jetting was observed from 50 or less nozzles.

C: Jetting disorder or empty jetting was observed from 51 or more nozzles.

<Production of Three-Dimensional Object>

A three-dimensional object was produced in the manner described below with the produced powder material 1 for forming a three-dimensional object and the liquid material for forming a three-dimensional object of Example 1, and a shape printing pattern having a size of 70 mm in length and 12 mm in width.

(1) With a known powder layer stack producing apparatus as illustrated in FIG. 1, the powder material 1 for forming a three-dimensional object was moved from the supplying-side powder storing tank to the forming-side powder storing tank to form a thin layer of the powder material 1 for forming a three-dimensional object having an average thickness of 100 μm over the support member.

(2) Next, the liquid material for forming a three-dimensional object of Example 1 was delivered (jetted) onto the surface of the formed thin layer of the powder material 1 for forming a three-dimensional object from nozzles of a known inkjet head to dissolve the polyvinyl alcohol in the water contained in the liquid material for forming a three-dimensional object of Example 1 and cross-link the polyvinyl alcohol by the action of the cross-linking agent (ammonium zirconium carbonate) contained in the liquid material for forming a three-dimensional object of Example 1.

(3) Next, the operations of (1) and (2) were repeated until a predetermined total average thickness of 3 mm, and hardened thin layers of the powder material 1 for forming a three-dimensional object were stacked up sequentially. Then, the stacked thin layers were subjected to a drying step in which the stacked thin layers were dried with a dryer at 50° C. for 4 hours and then maintained at 100° C. for 10 hours, to obtain a three-dimensional object.

Then, three-dimensional objects were produced with each of the liquid materials for forming a three-dimensional object of Examples 2 to 12 in the same manner as in Example 1. Furthermore, three-dimensional objects were produced with the powder material 2 for forming a three-dimensional object instead of the powder material 1 for forming a three-dimensional object and with each of the liquid materials for forming a three-dimensional object of Examples 1 to 12.

Each produced three-dimensional object was dewaxed at 500° C. for 1 hour and sintered at 1,200° C. for 2 hours to produce a sintered body.

The bending strength of each produced three-dimensional object and the ratio of space in each produced sintered body were evaluated based on the criteria described below. The results are presented in Table 1 to Table 4.

<Bending Strength of Three-Dimensional Object>

The bending strength of each produced three-dimensional object was measured with a universal tester (AUTOGRAPH TYPE AG-I) available from Shimadzu Corporation. A load cell for 1 kN and a 3-point bending jig were used.

Stress versus an amount of strain of each three-dimensional object under load-point displacement at a rate of 1 mm/minute and at a distance of 24 mm between supporting points was plotted, and the stress at the rupture point was read as the maximum stress. It is preferable that the bending strength measured in this manner be 5 MPa or greater.

<Ratio of Space in Sintered Body>

The ratio of space in each produced sintered body was calculated according to Ratio of space=[1−(density obtained according to Archimedean method/real density)]×100. The Archimedean density was measured with MS-DNY-54 available from Mettler-Toledo International Inc. The real density was 7.98 (which was the density of SUS316L).

TABLE 1

| | | Examples 1 | 2 | 3 | 4 |
|---|---|---|---|---|---|
| Organic solvent | 3-methyl-1,3-butanediol (vapor pressure: 15.05 mmHg) | 30 | 30 | 30 | 30 |
| | Propylene glycol (vapor pressure: 20.19 mmHg) | | | | |
| | 2,3-butanediol (vapor pressure: 36.99 mmHg) | | | | |
| | Glycerin (vapor pressure: 0.195 mmHg) | | | | |
| Surfactant | BYK345 | 0.1 | | 0.1 | 0.1 |
| | LATEMUL PD420 | | 0.2 | | |
| | DNS403N | | | | |
| Cross-linking agent | Zirconium carbonate ammonium salt | 5 | 5 | | |
| | Glyoxylate | | | 5 | |
| | Adipic acid dihydrazide | | | | 5 |
| Water | Water (vapor pressure at 100° C.: 760 mmHg) | 64.9 | 64.8 | 64.9 | 64.9 |
| Total (% by mass) | | 100 | 100 | 100 | 100 |
| Evaluation of properties of liquid material for forming three-dimensional object | Surface tension (mN/m) | 26.5 | 31.0 | 26.0 | 26.2 |
| | Viscosity (mPa · s) | 3.5 | 3.4 | 3.4 | 3.4 |
| | pH | 9 | 9 | 9 | 9 |
| | Continuous jetting stability | A | A | A | A |
| | Jetting stability after still standing | A | A | A | A |
| Dynamic contact angle (°) over coating film | Coating film 1 made of coating liquid 1 | 28.5 | 32.3 | 30.0 | 28.1 |
| | Coating film 2 made of coating liquid 2 | 42.2 | 43.4 | 42.1 | 40.7 |
| Strength (MPa) of three-dimensional object | Three-dimensional object formed of powder material 1 for forming three-dimensional object | 11.8 | 10.6 | 12 | 11.6 |
| | Three-dimensional object formed of powder material 2 for forming three-dimensional object | 9.5 | 8.5 | 9.3 | 9.0 |
| Ratio (%) of space in sintered body | Sintered body formed of powder material 1 for forming three-dimensional object | 7 | 6 | 7 | 7 |
| | Sintered body formed of powder material 2 for forming three-dimensional object | 4 | 4 | 4 | 4 |

TABLE 2

| | | Examples 5 | 6 | 7 | 8 |
|---|---|---|---|---|---|
| Organic solvent | 3-methyl-1,3-butanediol (vapor pressure: 15.05 mmHg) | | | | 30 |
| | Propylene glycol (vapor pressure: 20.19 mmHg) | 30 | | 30 | |
| | 2,3-butanediol (vapor pressure: 36.99 mmHg) | | 30 | | |
| | Glycerin (vapor pressure: 0.195 mmHg) | | | | |
| Surfactant | BYK345 | | | | |
| | LATEMUL PD420 | 0.2 | 0.2 | | |
| | DNS403N | | | | 0.1 |
| Cross-linking agent | Zirconium carbonate ammonium salt | 5 | 5 | 5 | 5 |
| | Glyoxylate | | | | |
| | Adipic acid dihydrazide | | | | |
| Water | Water (vapor pressure at 100° C.: 760 mmHg) | 64.8 | 64.8 | 65 | 64.9 |
| Total (% by mass) | | 100 | 100 | 100 | 100 |
| Evaluation of properties of liquid material | Surface tension (mN/m) | 31.8 | 31.2 | 43.5 | 24.0 |
| | Viscosity (mPa · s) | 3.0 | 3.1 | 3.1 | 3.4 |
| | pH | 9 | 9 | 9 | 9 |

TABLE 2-continued

| | | Examples | | | |
|---|---|---|---|---|---|
| | | 5 | 6 | 7 | 8 |
| for forming three- | Continuous jotting stability | A | A | B | A |
| dimensional object | Jetting stability after still standing | A | A | A | A |
| Dynamic contact angle | Coating film 1 made of coating liquid 1 | 28.3 | 33.0 | 42.5 | 24.0 |
| (°) over coating film | Coating film 2 made of coating liquid 2 | 42.9 | 41.8 | 77.3 | 40.6 |
| Strength (MPa) of three-dimensional object | Three-dimensional object formed of powder material 1 for forming three-dimensional object | 10.3 | 10.5 | 7.1 | 12.0 |
| | Three-dimensional object formed of powder material 2 for forming three-dimensional object | 8.1 | 8.3 | 5.74 | 10.6 |
| Ratio (%) of space in cross-section of sintered body | Sintered body formed of powder material 1 for forming three-dimensional object | 6 | 6 | 13 | 7 |
| | Sintered body formed of powder material 2 for forming three-dimensional object | 4 | 3 | 10 | 5 |

TABLE 3

| | | Examples | | | |
|---|---|---|---|---|---|
| | | 9 | 10 | 11 | 12 |
| Organic solvent | 3-methyl-1,3-butanediol (vapor pressure: 15.05 mmHg) | | | | |
| | Propylene glycol (vapor pressure: 20.19 mmHg) | | 15 | 50 | |
| | 2,3-butanediol (vapor pressure: 36.99 mmHg) | 50 | | | |
| | Glycerin (vapor pressure: 0.195 mmHg) | | | | 20 |
| Surfactant | BYK345 | | | | |
| | LATEMUL PD420 | 0.2 | 0.1 | 0.1 | 0.1 |
| | DNS403N | | | | |
| Cross-linking agent | Zirconium carbonate ammonium salt | 5 | 5 | 5 | 5 |
| | Glyoxylate | | | | |
| | Adipic acid dihydrazide | | | | |
| Water | Water (vapor pressure at 100° C.: 760 mmHg) | 44.8 | 79.9 | 44.9 | 74.9 |
| Total (% by mass) | | 100 | 100 | 100 | 100 |
| Evaluation of properties of liquid material for forming three-dimensional object | Surface tension (mN/m) | 30.3 | 31.2 | 30.5 | 31.0 |
| | Viscosity (mPa · s) | 7.8 | 1.7 | 7.5 | 2.5 |
| | pH | 9 | 9 | 9 | 9 |
| | Continuous jotting stability | A | B | A | A |
| | Jetting stability after still standing | B | B | A | A |
| Dynamic contact angle (°) over coating film | Coating film 1 made of coating liquid 1 | | | | |
| | Coating film 2 made of coating liquid 2 | 47.6 | 48.3 | 47.9 | 48.9 |
| Strength (MPa) of three-dimensional object | Three-dimensional object formed of powder material 1 for forming three-dimensional object | 11.5 | 10.3 | 8.1 | 5.7 |
| | Three-dimensional object formed of powder material 2 for forming three-dimensional object | 9.2 | 8.6 | 6.5 | 4.9 |

TABLE 3-continued

| | | Examples | | | |
|---|---|---|---|---|---|
| | | 9 | 10 | 11 | 12 |
| Ratio (%) of space in sintered body | Sintered body formed of powder material 1 for forming three-dimensional object | | | | |
| | Sintered body formed of powder material 2 for forming three-dimensional object | 4 | 4 | 6 | 5 |

TABLE 4

| | | Comparative Examples | | |
|---|---|---|---|---|
| | | 1 | 2 | 3 |
| Organic solvent | 3-methyl-1,3-butanediol (vapor pressure: 15.05 mmHg) | 30 | | 40 |
| | Propylene glycol (vapor pressure: 20.19 mmHg) | | 20 | |
| | 2,3-butanediol (vapor pressure: 36.99 mmHg) | | | |
| | Glycerin (vapor pressure: 0.195 mmHg) | | | |
| Surfactant | BYK345 | 0.1 | | |
| | LATEMUL PD420 | | | |
| | DNS403N | | | 0.2 |
| Cross-linking agent | Zirconium carbonate ammonium salt | | | 5 |
| | Glyoxylate | | | |
| | Adipic acid dihydrazide | | 5 | |
| Water | Water (vapor pressure at 100° C.: 760 mmHg) | 69.9 | 75 | 54.8 |
| Total (% by mass) | | 100 | 100 | 100 |
| Evaluation of properties of liquid material for forming three-dimensional object | Surface tension (mN/m) | 26.7 | 46.0 | 21.1 |
| | Viscosity (mPa · s) | 6.0 | 2.0 | 6.5 |
| | pH | 9 | 9 | 9 |
| | Continuous jotting stability | A | C | B |
| | Jetting stability after still standing | A | B | B |
| Dynamic contact angle (°) over coating film | Coating film 1 made of coating liquid 1 | 38.7 | 47.9 | 19.0 |
| | Coating film 2 made of coating liquid 2 | 40.0 | 82.0 | 28.6 |
| Strength (MPa) of three-dimensional object | Three-dimensional object formed of powder material 1 for forming three-dimensional object | | | 3.5 |
| | Three-dimensional object formed of powder material 2 for forming three-dimensional object | 2.4 | 1.5 | |
| Ratio (%) of space in sintered body | Sintered body formed of powder material 1 for forming three-dimensional object | | | |
| | Sintered body formed of powder material 2 for forming three-dimensional object | 8 | 14 | 13 |

Details of the components in Table 1 to Table 4 are as follows.

—Surfactant—

BYK345 (a silicone-based surfactant available from Byk-Chemie GmbH)

LATEMUL PD420 (a nonionic surfactant available from Kao Corporation)

DNS403N (a fluorosurfactant available from Daikin Industries, Ltd.)

—Cross-Linking Agent—

Zirconium carbonate ammonium salt (ZIRCOZOL AC-20 available from Daiichi Kigenso Kagaku Kogyo Co., Ltd.)

Glyoxylate (SAFELINK SPM-01 available from Nippon Synthetic Chemical Industry Co., Ltd.)

Adipic acid dihydrazide (available from Otsuka Chemical Co., Ltd.)

Aspects of the present invention are as follows, for example.

<1> A liquid material for forming a three-dimensional object, the liquid material adapted to harden a powder material for forming a three-dimensional object, the powder material including an organic material, the liquid material including:

a solvent; and a cross-linking agent, wherein a dynamic contact angle of the liquid material over a film made of the organic material is from 20° to 80°.

<2> The liquid material for forming a three-dimensional object according to <1>, wherein the liquid material is capable of dissolving the organic material.

<3> The liquid material for forming a three-dimensional object according to <1> or <2>, wherein the powder material is a powder material containing a base material coated with the organic material.

<4> The liquid material for forming a three-dimensional object according to any one of <1> to <3>, wherein the solvent includes an organic solvent, and wherein a vapor pressure of the organic solvent at 100° C. is 10 mmHg or greater.

<5> The liquid material for forming a three-dimensional object according to <4>, wherein a content of the organic solvent is from 10% by mass to 50% by mass.

<6> The liquid material for forming a three-dimensional object according to any one of <1> to <5>, further including a surfactant.

<7> The liquid material for forming a three-dimensional object according to any one of <1> to <6>, wherein the cross-linking agent is at least one of an organotitanium compound and an organozirconium compound.

<8> The liquid material for forming a three-dimensional object according to any one of <1> to <7>, wherein a viscosity of the liquid material at 25° C. is from 3 mPa·s to 20 mPa·s.

<9> The liquid material for forming a three-dimensional object according to any one of <1> to <8>, wherein a surface tension of the liquid material at 25° C. is mN/m or less.

<10> A material set for forming a three-dimensional object, the material set including:

a powder material for forming a three-dimensional object, the powder material including an organic material and a base material; and the liquid material for forming a three-dimensional object according to any one of <1> to <9>.

<11> The material set for forming a three-dimensional object according to <10>, wherein the powder material is a powder material including the base material coated with the organic material.

<12> The material set for forming a three-dimensional object according to <11>, wherein the organic material is a water-soluble resin.

<13> The material set for forming a three-dimensional object according to <12>, wherein the water-soluble resin is a polyvinyl alcohol.

<14> A three-dimensional object producing method including:

a powder material layer forming step of forming a layer of a powder material for forming a three-dimensional object, the powder material including an organic material and a base material; and a liquid material delivering step of delivering the liquid material for forming a three-dimensional object according to any one of <1> to <9> to a predetermined region of the layer of the powder material formed in the powder material layer forming step, wherein the three-dimensional object producing method repeats the powder material layer forming step and the liquid material delivering step.

<15> The three-dimensional object producing method according to <14>, further including a sintering step of sintering a three-dimensional object produced by repeating the powder material layer forming step and the liquid material delivering step.

<16> The three-dimensional object producing method according to <14> or <15>, wherein delivering of the liquid material for forming a three-dimensional object is performed according to an inkjet method.

<17> A three-dimensional object producing apparatus including:

a powder material layer forming unit configured to form a layer of a powder material including an organic material and a base material;

a liquid material delivering unit configured to deliver the liquid material for forming a three-dimensional object according to any one of <1> to <9> to a predetermined region of the layer of the powder material formed by the powder material layer forming unit;

a powder material container storing the powder material; and a liquid material container storing the liquid material for forming a three-dimensional object.

<18> A three-dimensional object produced according to the three-dimensional object producing method according to any one of <14> to <16>, wherein a ratio of space in a sintered body of the three-dimensional object is 10% or lower.

This application claims priority to Japanese application No. 2014-245719, filed on Dec. 4, 2014 and incorporated herein by reference.

What is claimed is:

1. A material set for forming a three-dimensional object, the material set comprising:

a powder material for forming a three-dimensional object, where the powder material comprises an organic material and a base material; and a liquid material for forming a three-dimensional object which is adapted to harden a powder material for forming a three-dimensional object and comprises:

a solvent; and a cross-linking agent, wherein a dynamic contact angle of the liquid material over a film made of the organic material is from 200 to 800.

2. The material set for forming a three-dimensional object according to claim 1, wherein the liquid material is capable of dissolving the organic material.

3. The material set for forming a three-dimensional object according to claim 1, wherein the solvent comprises an organic solvent, and wherein a vapor pressure of the organic solvent at 100° C. is 10 mmHg or greater.

4. The material set for forming a three-dimensional object according to claim 3, wherein the powder material is a powder material that comprises a base material coated with the organic material.

5. The material set for forming a three-dimensional object according to claim 3, wherein a content of the organic solvent is from 10% by mass to 50% by mass.

6. The material set for forming a three-dimensional object according to claim 1, further comprising a surfactant.

7. The material set for forming a three-dimensional object according to claim 1, wherein the cross-linking agent comprises at least one of an organotitanium compound and an organozirconium compound.

8. The material set for forming a three-dimensional object according to claim 1, wherein a viscosity of the liquid material at 25° C. is from 3 mPa·s to 20 mPa·s.

9. The material set for forming a three-dimensional object according to claim 1, wherein a surface tension of the liquid material at 25° C. is 40 mN/m or less.

10. The material set for forming a three-dimensional object according to claim 1, wherein the powder material is a powder material that comprises the base material coated with the organic material.

11. The material set for forming a three-dimensional object according to claim 10, wherein the organic material comprises a water-soluble resin.

12. The material set for forming a three-dimensional object according to claim 11, wherein the water-soluble resin comprises a polyvinyl alcohol.

13. A three-dimensional object producing method comprising:

forming a layer of the powder material for forming a three-dimensional object as set forth in the material set of claim 1; and delivering the liquid material for forming a three-dimensional object as set forth in the material set of claim 1 to a predetermined region of the layer of the powder material, wherein the three-dimensional object producing method repeats the forming and the delivering.

14. The three-dimensional object producing method according to claim 13, further comprising sintering a three-dimensional object produced by repeating the forming and the delivering.

15. The three-dimensional object producing method according to claim 13, wherein the delivering of the liquid material for forming a three-dimensional object is performed according to an inkjet method.

* * * * *